3,385,907
MIXED POTASSIUM-SODIUM OXIDES IN
IODINE RECOVERY FOR DEHYDRO-
GENATION OF HYDROCARBONS
Petrus M. Beneken-Kolmer, Amsterdam, Netherlands, assignor to Shell Oil Company, New York, N.Y., a corporation of Delaware
No Drawing. Filed Apr. 27, 1966, Ser. No. 545,568
Claims priority, application Netherlands, Oct. 5, 1965, 65—12,875
2 Claims. (Cl. 260—683.3)

ABSTRACT OF THE DISCLOSURE

Poor fluidization (agglomeration) occurs in the finely divided acceptor/carrier particles when sodium oxide alone is the acceptor or, say, alumina carrier. Addition of 0.5–2.0 moles $K:N_a$ gives excellent fluidization and permits much higher iodine loading.

---

The present invention relates to an improved process for the iodative dehydrogenation of aliphatic hydrocarbons to hydrocarbons having a higher carbon-to-hydrogen ratio.

Gerhard Baijle et al., in U.S. Patent 3,130,241, issued Apr. 21, 1964, disclose a process for the iodative dehydrogenation of a first hydrocarbon to a second hydrocarbon having a higher carbon-to-hydrogen ratio by: (1) reacting the first hydrocarbon with iodine in the presence of a metal oxide as hydrogen iodide acceptor; (2) separating the hydrocarbon product of the reaction from the metal iodide resulting from the reaction of the hydrogen iodide with the acceptor; (3) treating the separated metal iodide with oxygen-containing gas to liberate free iodine and to regenerate the hydrogen iodide acceptor; and (4) recycling the iodine thus liberated and the regenerated hydrogen iodide acceptor to the reaction zone for reaction with additional quantities of the first hydrocarbon. Several metal oxides are disclosed in the Baijle patent as suitable hydrogen iodide acceptors in the reaction of iodine with the organic compound.

Belgian Patent 641,756, published June 24, 1964, describes a similar process for the iodative dehydrogenation of hydrocarbons using as an acceptor for the hydrogen iodide the oxides of the alkali metals, strontium and/or barium, supported by silica, alumina, or silica/alumina mixtures, which oxides react with hydrogen iodide to form iodides. The iodides are subsequently treated with oxygen or oxygen-containing gases, thus liberating free iodine and regenerating the metal oxide. The entire process takes place in the absence of metal compounds where the valency of the metal would be reduced as a result of the dehydrogenation reaction, or increased as a result of the treatment with oxygen or oxygen-containing gases. In the Belgian patent, the only alkali metal oxide acceptor specifically mentioned is sodium oxide.

In general, the processes of the two above-mentioned patents provide for silica, alumina, or mixed silica-alumina carriers or supports to be present in the form of finely divided particles, mobilized by a stream of gas. In one embodiment, a fluidized bed is employed, while, in another, a moving bed is used. In both, it is very important that the freedom of movement of the finely divided particles be preserved throughout the process.

The metal oxide is chemically and physically combined with the silica and/or alumina support, the composite reacting readily with hydrogen iodide in an iodative dehydrogenation zone to form a composite metal iodide/oxide/hydroxide support which readily reacts in a separate regeneration zone with oxygen or an oxygen-containing gas to liberate iodine and regenerate the acceptor composite. The support should be such that the metal iodide/oxide/hydroxide is sufficiently adherent to it at reaction temperature to provide and maintain the metal iodide/oxide/hydroxide thereon, while preferably leaving the solid mass fluidizable in pulverulent form.

The advantages obtained from using fluidized solid-reactant particulate materials will be understood and appreciated by those familiar with the use of moving solid particles in a reaction zone. The principles, features and requisites of fluidization of finely divided solids are well-known and have been applied in various processing fields, especially catalytic cracking of petroleum fractions. They are readily adapted to the present invention and are more specifically set forth in copending U.S. patent application Ser. No. 227,732, filed May 3, 1963.

The fluidized state can be obtained by passing a gas, or vapor, or in some cases a liquid which is rapidly vaporized upon contact with the solid, up through a bed of powdered solid. If a gas is introduced at a very low rate, into the bottom of a settled bed of fluidized solid, the gas simply passes through the minute interstices and out of the top of the bed without affecting the bed itself. If the gas velocity is increased slowly, a point is reached at which the bed expands somewhat and the particles move about. The point at which this occurs may be called the minimum fluidization gas velocity. This minimum fluidization gas velocity depends somewhat upon the particular solid being used in the bed, but is usually of the order of 0.01–0.20 foot per second for most fluidizable powders.

Now, in accordance with the present invention, it has been found that when sodium oxide is used as hydrogen iodide acceptor, preservation of the freedom of movement of the finely divided particles, i.e., the favorable fluidizability of the acceptor-carrier composite, can present problems if the conditions under which the dehydrogenation is conducted are such that the amount of iodine in the composites exceeds a certain limit. This limit may be slightly different for each of the various sodium oxide/carriers described in the above-mentioned Belgian patent; but for most of these composites, the maximum permissible iodide content is not more than about 4 to 6 percent by weight, calculated as iodine on the acceptor/carrier.

One of the consequences of the 4 to 6 percent by weight iodine content limitation is that when sodium oxide/carrier systems capable of taking up more than about 5 percent by weight of iodine (as iodides) are used, only a percentage of the total capacity of the systems for the uptake of iodine can be effectively utilized. The percentage utilizable is adversely small, particularly in those systems which are theoretically preferable on the grounds of achieving high rates of hydrocarbon conversion and high diene selectivity in the dehydrogenation reaction, viz., systems capable of taking up more than 8 percent by weight of iodine. With such systems, the maximum iodine content permitting the desired favorable fluidizability is so low that the desired optimum results cannot be attained.

In accordance with the present invention, it has now been found that if instead of sodium oxide, a mixture of the oxides of sodium and potassium in a molar ratio of between about 2.0 and 0.5 is used as hydrogen iodide acceptor, the amount of iodides in the compositions can be varied quite freely without any adverse effects on the fluidizability of the acceptor/carrier systems. This applies not only to systems of low iodine uptake capacity, but also to those capable of taking up significantly more than 10 percent, e.g., 12 to 16 percent, by weight of iodine. The advantage in using the new acceptor/carrier systems in the dehydrogenation process is that, since the iodine content of these newly-found systems is not critically limited, the optimum dehydrogenation results can easily be achieved without difficulties arising concerning the fluidizability of the compositions used.

The invention thus comprises an improved process for the dehydrogenation of hydrocarbons by reaction with iodine in the presence of oxides of the alkali metals, bound to silica, alumina, or silica/alumina mixtures, which oxides react with hydrogen iodide to form iodides and are subsequently regenerated in a separate operation by treating the compositions incorporating the iodides thus formed with oxygen or oxygen-containing gases, the entire process taking place in the absence of metal compounds where the valency of the metal would be reduced as a result of the dehydration reaction and increased as a result of the treatment with oxygen or oxygen-containing gases, as described in Belgian Patent 641,756, and where the silica, alumina or silica/alumina mixture is present in the form of finely-divided solid particles mobilized by a stream of gas, the characteristic feature of the process of this invention being that the oxides reacting with hydrogen iodide to form iodides are the oxides of potassium and of sodium mixed in molar ratios of between about 0.5 to 2.0.

The process of the present invention is particularly applicable when the acceptor/carrier systems employed contain a total of more than 0.12 gram-equivalent of sodium and potassium oxide per 100 grams of carrier. However, the invention is not limited to such systems; in some cases, systems containing from 0.05 to 0.1 gram equivalent acceptor per 100 grams of carrier can be used advantageously. In any event, the amount of sodium oxide/hydroxide on the carrier should be enough to give an uptake of greater than 6 percent by weight of iodine, over and above the amount of iodine uptake attributable to the potassium oxide/hydroxide.

Details of the dehydrogenation process, suitable equipment, suitable carriers and the preparation of the acceptor/carrier systems are described in Belgian Patent 654,756 and in French Patent 1,356,634.

The dehydrogenation process of the present invention is usually carried out at temperatures of between about 500 to 560° C. Particularly suitable carriers are silica/alumina systems containing at most 15 percent silica based on the total weight of the carriers.

The following examples are given for illustrative purposes only, and are not to be considered as limiting the invention. All percentages are expressed in percent by weight.

Example I

The acceptor/carrier systems given in Table I were prepared by impregnating an alumina (surface area=145 m.²/g., pore volume=0.23 ml./g.) with aqueous solutions of water glass ($Na_2O \cdot 3.6SiO_2$) and/or sodium hydroxide and/or potassium hydroxide. The impregnated carriers were dried by heating in dry air for 20 hours at 150° C.

TABLE I

| | I | II | III | IV | V |
|---|---|---|---|---|---|
| Composition in grams: | | | | | |
| $Al_2O_3$ | 100 | 100 | 100 | 100 | 100 |
| $SiO_2$ | 9.6 | 0.0 | 9.1 | 9.2 | 9.2 |
| $Na_2O$ | 6.2 | 2.9 | 3.3 | 3.2 | 3.2 |
| $K_2O$ | 0.0 | 0.0 | 3.3 | 3.9 | 5.0 |
| Molar ratio $Na_2O/K_2O$ | | | 1.5 | 1.3 | 1.0 |

A series of experiments was then carried out to investigate the fluidization behavior of each of these compositions when containing varying amounts of iodides. For this purpose, each acceptor/carrier system was fluidized in a glass tube with the aid of a stream of nitrogen. Then hydrogen iodide was added to the nitrogen flowing through the fluidized bed. The composition of the resultant gas mixture was constant throughout the whole of each experiment, so that the amount of iodides incorporated in the fluidized systems gradually increased as a result of the reaction between the acceptor and the hydrogen iodide. The control experiments with compositions I and II were continued until agglomeration of the particles caused serious disturbances of the fluidization. The time at which this occurred was clearly observed: the transition from a properly fluidized system to a system of conglomerated particles took only a few seconds once the critical iodine content had been reached.

Table II gives the values for the critical iodide content found in each case, expressed in grams of iodine per 100 grams carrier/acceptor. The figure in the last column, headed $I_{max.}$, is the maximum amount of hydrogen iodide, expressed as grams of iodine per 100 grams carrier/acceptor, that could be taken up, disregarding fluidization difficulties.

TABLE II

| Composition | Temperature, ° C. | | | $I_{max.}$ |
|---|---|---|---|---|
| | 510 | 525 | 540 | |
| I | 4.3 | 4.3 | 4.5 | 11 |
| II | 5.4 | 5.5 | 5.5 | 11 |

The same experiments were repeated under identical conditions with compositions III, IV, and V at the same three temperatures. For these compositions, $I_{max.}$ was 9.5, 12 and 14 respectively.

In these latter experiments, the acceptor/carrier systems were satisfactorily fluidizable at any iodide content between I and $I_{max.}$.

Example II

In several runs, butane was dehydrogenated at a temperature of 540° C. with the aid of compositions I to V, described in Example I. The apparatus used consisted of two vertically mounted tubes connected in series. One tube, 4 meters long and 8 millimeters in diameter, served as regenerator; and the other tube, 1.6 meters long and 10 millimeters in diameter, acted as dehydrogenator. At the bottom of the regenerator, a mixture of nitrogen and oxygen was blown in, while the butane was introduced at the top of the dehydrogenator. The acceptor/carrier systems, in finely divided form, were entrained by the flow of gas up through the regenerator and down through the dehydrogenator. After passing through the dehydrogenator, the solid material was separated from the gas mixture, and passed back to the regenerator.

The results obtained from these runs are noted in Table III.

TABLE III

| Composition | Run No. | | | | | | |
|---|---|---|---|---|---|---|---|
| | 1 | 2 | 3 | 4 | 5 | 6 | 7 |
| | I | I | II | II | III | IV | V |
| Oxygen/hydrocarbon, mole/mole | 0.88 | 0.88 | 0.88 | 0.88 | 0.88 | 0.88 | 0.88 |
| Nitrogen/hydrocarbon, mole/mole | 4.7 | 4.7 | 4.7 | 4.7 | 4.7 | 4.7 | 4.7 |
| Acceptor/hydrocarbon, weight/weight | 220 | 220 | 220 | 220 | 220 | 220 | 220 |
| Residence time in dehydrogenator, sec | 2.0 | 2.0 | 2.0 | 2.0 | 2.0 | 2.0 | 2.0 |
| Iodine content, grams $I_2$/100 grams composition | 4.0 | 5.5 | 5.0 | 7.5 | 5.5 | 6.5 | 10.2 |
| $I_{max}$ | 11 | 11 | 11 | 11 | 9.5 | 12 | 14 |
| Hydrocarbon conversion, percent | 70 | 85 | 68 | 77 | 87 | 86 | 88 |
| Selectivity, percent, to: | | | | | | | |
| Dienes | 62 | 73 | 62 | 66 | 68 | 70 | 71 |
| Alkenes | 5 | 8 | 5 | 16 | 11 | 7.5 | 9 |
| Cracked products | 19 | 12 | 18 | 9 | 14.5 | 16 | 14 |
| $CO+CO_2$ | 11 | 5 | 12 | 7 | 4.5 | 4.5 | 4 |
| Polymers | 3 | 2 | 3 | 2 | 2 | 2 | 2 |
| Total | 100 | 100 | 100 | 100 | 100 | 100 | 100 |

At no point during either runs 1 and 3 or runs 5, 6 and 7 were difficulties encountered with the fluidization of the acceptor/carrier system. In all cases, individual runs lasted more than 150 hours.

Runs 2 and 4 demonstrate that an increase in the iodide content, brought about by slightly increasing the supply of iodine, can lead to increased hydrocarbon conversion and diene selectivity. At regular intervals throughout these runs, however, the finely divided acceptor/carrier particles entrained in the flow of gas agglomerated together, so that periodically special measures had to be taken to restore the desired fluidization. The high rates of conversion given in Table III were reached only in the relatively short periods during which fluidization appeared to be favorable. In contradistinction, the high rates of conversion in runs 5, 6 and 7 were maintained throughout.

Comparison of the results given above shows that with regard to the achievement of high rates of hydrocarbon conversion and high diene selectivity while maintaining the desired favorable fluidizability of the compositions, the process of the invention is definitely superior to the use or acceptor/carrier systems which contain sodium oxide as the only alkali metal oxide.

I claim as my invention:

1. In a process for the dehydrogenation of hydrocarbons by reaction with iodine in the presence of alkali metal oxide bound to silica, alumina, or mixtures thereof, as hydrogen iodide acceptor, which oxide reacts with hydrogen iodide to form iodides and are subsequently regenerated in a separate operation by treating the compositions incorporating the iodide thus formed with oxygen or oxygen-containing gases, the entire process taking place in the absence of metal compounds where the valency of the metal would be reduced as a result of the dehydrogenation operation and increased as a result of the treatment with oxygen or oxygen-containing gases, and where the silica, alumina, or silica/alumina mixture is present in the form of finely-divided solid particles mobilized by a stream of gas, the improvement comprising employing as hydrogen iodide acceptor a mixture of potassium and sodium oxides in a molar ratio of from about 0.5 to about 2.0, the amount of sodium oxide present being great enough to give an iodine uptake of greater than about 6 percent by weight iodine.

2. A process in accordance with claim 1 wherein the amount of the oxides of potassium and sodium totals more than 0.1 gram-equivalent per 100 grams of silica, alumina or silica/alumina mixture.

References Cited
UNITED STATES PATENTS 3,080,435  3/1963  Nager _____ 260—673.5
3,168,584  2/1965  Nager _____ 260—673
3,310,596  3/1967  King _____ 260—680

DELBERT E. GANTZ, *Primary Examiner.*

G. E. SCHMITKONS, *Assistant Examiner.*